US011796324B2

(12) United States Patent
Satoh

(10) Patent No.: US 11,796,324 B2
(45) Date of Patent: Oct. 24, 2023

(54) VEHICLE CONTROL DEVICE

(71) Applicant: Hitachi Astemo, Ltd., Hitachinaka (JP)

(72) Inventor: Hiroyuki Satoh, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 165 days.

(21) Appl. No.: 17/436,984

(22) PCT Filed: Feb. 7, 2020

(86) PCT No.: PCT/JP2020/004723
§ 371 (c)(1),
(2) Date: Sep. 7, 2021

(87) PCT Pub. No.: WO2020/184013
PCT Pub. Date: Sep. 17, 2020

(65) Prior Publication Data
US 2022/0178703 A1  Jun. 9, 2022

(30) Foreign Application Priority Data
Mar. 12, 2019  (JP) ................. 2019-044343

(51) Int. Cl.
*G01C 21/32* (2006.01)
*B60W 30/12* (2020.01)
(Continued)

(52) U.S. Cl.
CPC ............. *G01C 21/32* (2013.01); *B60W 30/12* (2013.01); *B60W 40/06* (2013.01); *G01S 19/396* (2019.08);
(Continued)

(58) Field of Classification Search
CPC ..... G01C 21/32; G01S 19/396; G01S 19/485; G06V 20/588; B60W 30/12; B60W 40/06;
(Continued)

(56) References Cited

U.S. PATENT DOCUMENTS

2018/0111613 A1* 4/2018 Oh .................. G06V 20/588
2019/0234745 A1* 8/2019 Lee .................. B60W 60/001
(Continued)

FOREIGN PATENT DOCUMENTS

JP   2004-341941 A   12/2004
JP   2010-069921 A    4/2010
(Continued)

OTHER PUBLICATIONS

Min Bai, Deep Multi-Sensor Lane Detection, Nov. 23, 2018, University of Toronto (Year: 2018).*
(Continued)

*Primary Examiner* — Elaine Gort
*Assistant Examiner* — Matthias S Weisfeld
(74) *Attorney, Agent, or Firm* — Volpe Koenig

(57) ABSTRACT

Provided is a technique that when a traveling lane is determined by using a plurality of detection methods, can accurately estimate the traveling lane even if any of the detection methods is not sufficient in accuracy. A vehicle control device according to the present invention calculates integrated reliabilities by integrating reliabilities of lane estimation results by a first detector and reliabilities of lane estimation results by a second detector, and estimates a lane in which a vehicle is traveling by comparing the integrated reliabilities with each other.

10 Claims, 6 Drawing Sheets

(51) Int. Cl.
- *B60W 40/06* (2012.01)
- *G01S 19/39* (2010.01)
- *G01S 19/48* (2010.01)
- *G06V 20/56* (2022.01)

(52) U.S. Cl.
CPC .......... *G01S 19/485* (2020.05); *G06V 20/588* (2022.01); *B60W 2420/42* (2013.01); *B60W 2552/10* (2020.02); *B60W 2552/53* (2020.02); *B60W 2556/40* (2020.02); *B60W 2556/60* (2020.02)

(58) Field of Classification Search
CPC ......... B60W 2552/53; B60W 2556/40; B60W 2556/60; B60W 2552/10; B60W 2420/42

USPC ........................................................ 701/409
See application file for complete search history.

(56) References Cited

U.S. PATENT DOCUMENTS

| | | | |
|---|---|---|---|
| 2019/0263405 A1* | 8/2019 | Schack | G01C 21/3658 |
| 2020/0003567 A1* | 1/2020 | Minamiguchi | G06T 7/70 |

FOREIGN PATENT DOCUMENTS

| | | | | |
|---|---|---|---|---|
| JP | 2015-001773 A | 1/2015 | | |
| WO | 2018/019464 A1 | 2/2018 | | |
| WO | WO-2018063245 A1 * | 4/2018 | | G01C 21/30 |
| WO | 2018/168961 A1 | 9/2018 | | |
| WO | WO-2019073024 A1 * | 4/2019 | | |

OTHER PUBLICATIONS

International Search Report, PCT/JP2020/004723, dated Jun. 2, 2020.

Cui et al., "Real-Time Global Localization of Robotic Cars in Lane Level via Lane Marking Detection and Shape Registration", Paper, IEEE (2016).

European Search Report dated Oct. 20, 2022 for European Patent Application No. 20770704.3.

* cited by examiner

| | | \multicolumn{4}{c|}{RELIABILITY FOR EACH LANE} | REMARKS |
|---|---|---|---|---|---|---|
| | | 1 | 2 | 3 | 4 | |
| INPUT | FIRST DETECTOR | 0 | 0 | 0 | 0 | |
| | SECOND DETECTOR | 0 | 80 | 80 | 0 | |
| | THIRD DETECTOR | 35 | 90 | 40 | 0 | |
| | FOURTH DETECTOR | 0 | 50 | 0 | 0 | |
| | TOTAL FOR LANE | 35 | 220 | 120 | 0 | |
| PROCESSING | GRAND TOTAL OF RELIABILITIES | \multicolumn{4}{c|}{375} | |
| | INTEGRATED RELIABILITY | 9 | 59 | 32 | 0 | TOTAL FOR LANE/ GRAND TOTAL ×100 |

FIG. 5

(a) LANE MARKING TYPE | ON LEFT SIDE OF ONE'S OWN VEHICLE: SOLID LINE / ON RIGHT SIDE OF ONE'S OWN VEHICLE: DOTTED LINE (b) COLLATION WITH MAP DATA
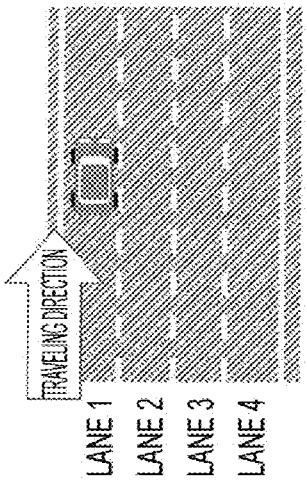

LANE 1
LANE 2
LANE 3
LANE 4
TRAVELING DIRECTION (c) RELIABILITY
LANE 1: RELIABILITY HIGH
LANE 2: RELIABILITY LOW
LANE 3: RELIABILITY LOW
LANE 4: RELIABILITY LOW

ON LEFT SIDE OF ONE'S OWN VEHICLE: DOTTED LINE / ON RIGHT SIDE OF ONE'S OWN VEHICLE: DOTTED LINE

LANE 1: RELIABILITY LOW
LANE 2: RELIABILITY MIDDLE
LANE 3: RELIABILITY MIDDLE
LANE 4: RELIABILITY LOW

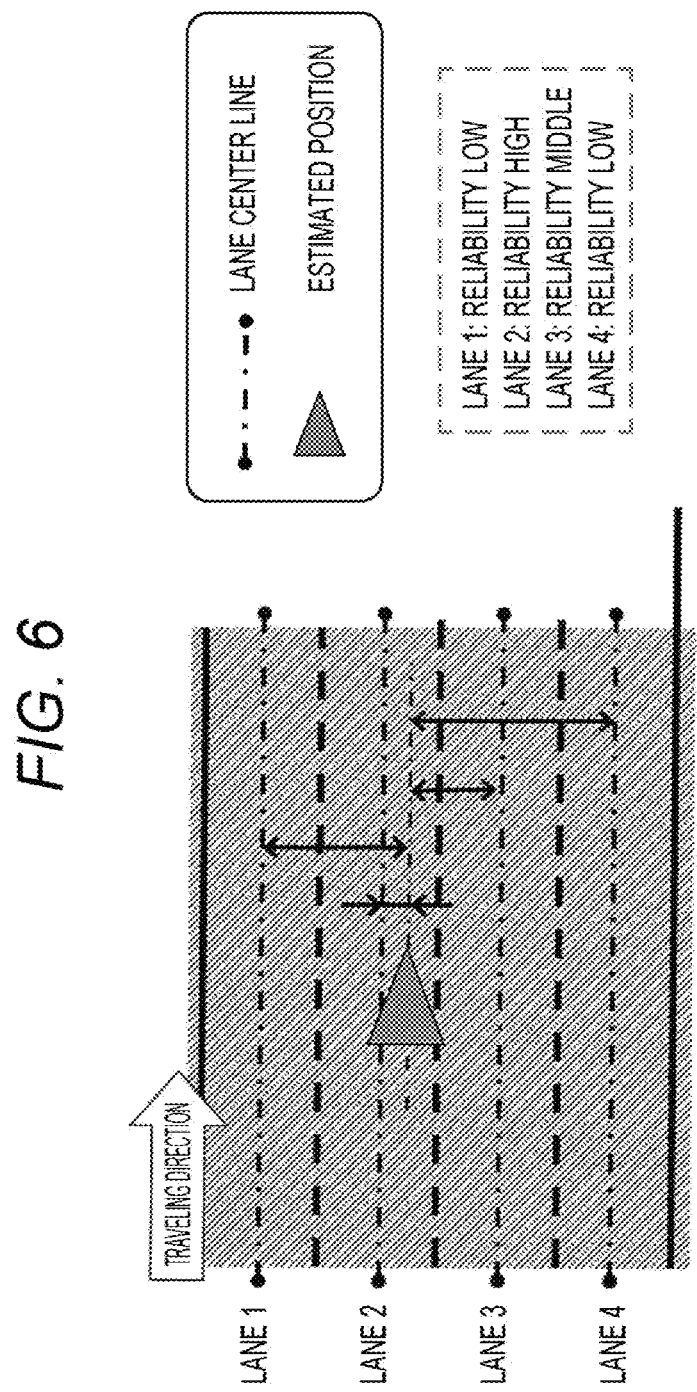

VEHICLE CONTROL DEVICE

TECHNICAL FIELD

The present invention relates to a vehicle control device that controls operations of a vehicle.

BACKGROUND ART

Techniques for automatically driving a vehicle are currently under active development. In the automatic driving, it is important to estimate the position of a vehicle with high accuracy. In general, the position of a vehicle can be estimated with high accuracy by combining the absolute position, orientation, and vehicle speed of a vehicle that are estimated by, for example, a global navigation satellite system (GNSS) with the relative amount of movement of the vehicle that is estimated by a vehicle speed sensor or a gyro sensor.

When a vehicle control device supports vehicle driving by a driver, it may be useful to estimate which lane of a road a vehicle is traveling in, in addition to the position of the vehicle. For example, in a situation where a vehicle is traveling on an expressway, it can be thought that by estimating a lane (traveling lane) in which the vehicle is traveling, it is determined which of the main line of the expressway or a branch road the vehicle is traveling on, so that driving support suitable for a road type is provided.

The following PTL 1 discloses a technique for estimating a traveling lane. The purpose of the PTL 1 is to "accurately estimate whether or not one's own vehicle has entered a branch road that branches off from the main line of a traveling road." The PTL 1 discloses a technique in which "the number of lanes of the road on which the one's own vehicle is traveling is detected (S110), the number of the lanes and the traveling lane for the one's own vehicle are estimated from a detection result by a delineator (S120), and the number of the lanes and the traveling lane for the one's own vehicle are estimated from a detection result of the preceding vehicle (S130). Then, based on "the number of lanes of the road on which the one's own vehicle is traveling" detected in S110, "the estimation result of the traveling lane based on the delineator", and "the estimation result of the traveling lane based on the preceding vehicle," the traveling lane for the one's own vehicle is estimated (S140). Therefore, the reliability of the estimation result of the traveling lane can be enhanced, and it can be accurately estimated based on the estimation result whether or not the one's own vehicle has entered a branch road that branches off from the main line of the traveling road." (see ABSTRACT).

CITATION LIST

Patent Literature

PTL 1: JP 2004-341941 A

SUMMARY OF INVENTION

Technical Problem

In the conventional traveling lane estimation, it is common to estimate a traveling lane using a single detection method. In such a method, the reliability of the estimation result itself decreases in an environment where, for example, the accuracy of a sensor used in the detection method decreases.

When a plurality of detection methods are used as in the above PTL 1, and if any of the detection methods is low in accuracy, the low-accurate detection method may adversely affect the final estimation result. If detection methods each assumed to have a sufficiently high accuracy are only adopted, it is difficult to sufficiently exhibit the effect of using a plurality of detection methods.

The present invention has been made in view of the above problems, and an object of the present invention is to provide a technique that when a traveling lane is determined by using a plurality of detection methods, can accurately estimate the traveling lane even if any of the detection methods is not sufficient in accuracy.

Solution to Problem

A vehicle control device according to the present invention calculates integrated reliabilities by integrating reliabilities of traveling lane estimation results by a first detector and the reliabilities of traveling lane estimation results by a second detector, and estimates a traveling lane by comparing the integrated reliabilities with each other.

Advantageous Effects of Invention

According to the vehicle control device of the present invention, the reliabilities of the respective estimation results by the respective detectors are integrated and compared with each other, so that a traveling lane can be accurately estimated even if the accuracy of the estimation result by any of the detectors is not sufficient.

Further, according to the vehicle control device of the present invention, the estimation results by the respective detectors are compared with each other by a unified measure of reliability, so that a detector can be easily added or deleted.

BRIEF DESCRIPTION OF DRAWINGS

FIG. 5 is a view for explaining the reliability of an estimation result by a second detector 1132.

FIG. 6 is a view for explaining the reliability of an estimation result by a third detector 1133.

DESCRIPTION OF EMBODIMENTS

First Embodiment

Figure 1:
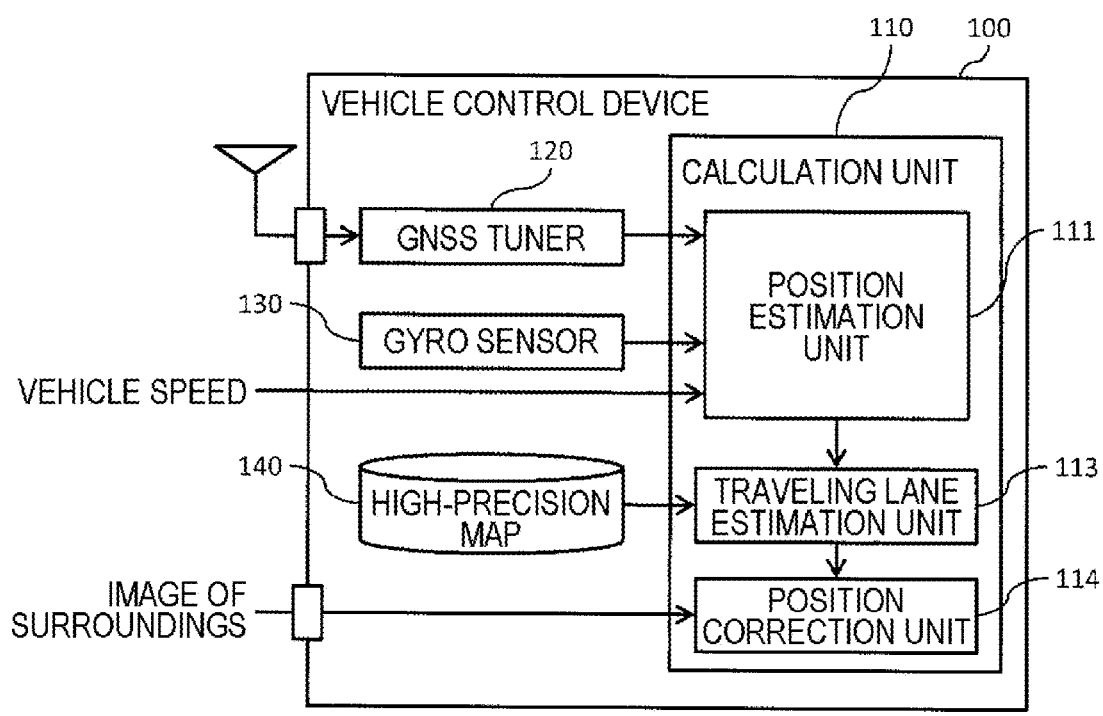
FIG. 1 is a configuration view of a vehicle control device 100 according to a first embodiment.

FIG. 1 is a configuration view of a vehicle control device 100 according to a first embodiment of the present invention. The vehicle control device 100 is a device that controls operations of a vehicle, and is mounted in the vehicle. The vehicle control device 100 includes a calculation unit 110, a GNSS tuner 120, a gyro sensor 130, and a high-precision map 140. The calculation unit 110 has a position estimation unit 111, a traveling lane estimation unit 113, and a position correction unit 114.

The GNSS tuner 120 acquires the absolute position, orientation, and moving speed of the vehicle from a GNSS. The gyro sensor 130 measures an angular velocity for each rotation axis of the vehicle and estimates the attitude of the vehicle.

As the rotation axis, only a yaw axis or three axes including also a pitch axis and a roll is/are generally measured. The high-precision map 140 is stored in advance in a storage device included in the vehicle control device 100. For example, coordinates of road center lines and lane markings constituting traveling lanes can be stored as the high-precision map 140.

The position estimation unit 111 estimates the position of the vehicle by using information such as the absolute position, orientation, and moving speed acquired by the GNSS tuner 120, and the angular velocity and vehicle speed of the vehicle acquired by the gyro sensor 130. The traveling lane estimation unit 113 estimates the road on and the traveling lane in which the vehicle is traveling by comparing the position of the vehicle with the high-precision map 140. Details will be described later. The position correction unit 114 acquires an image of the surroundings of the vehicle from an imaging device such as a camera in order to correct the position of the vehicle based on the image of the surroundings.

Figure 2:
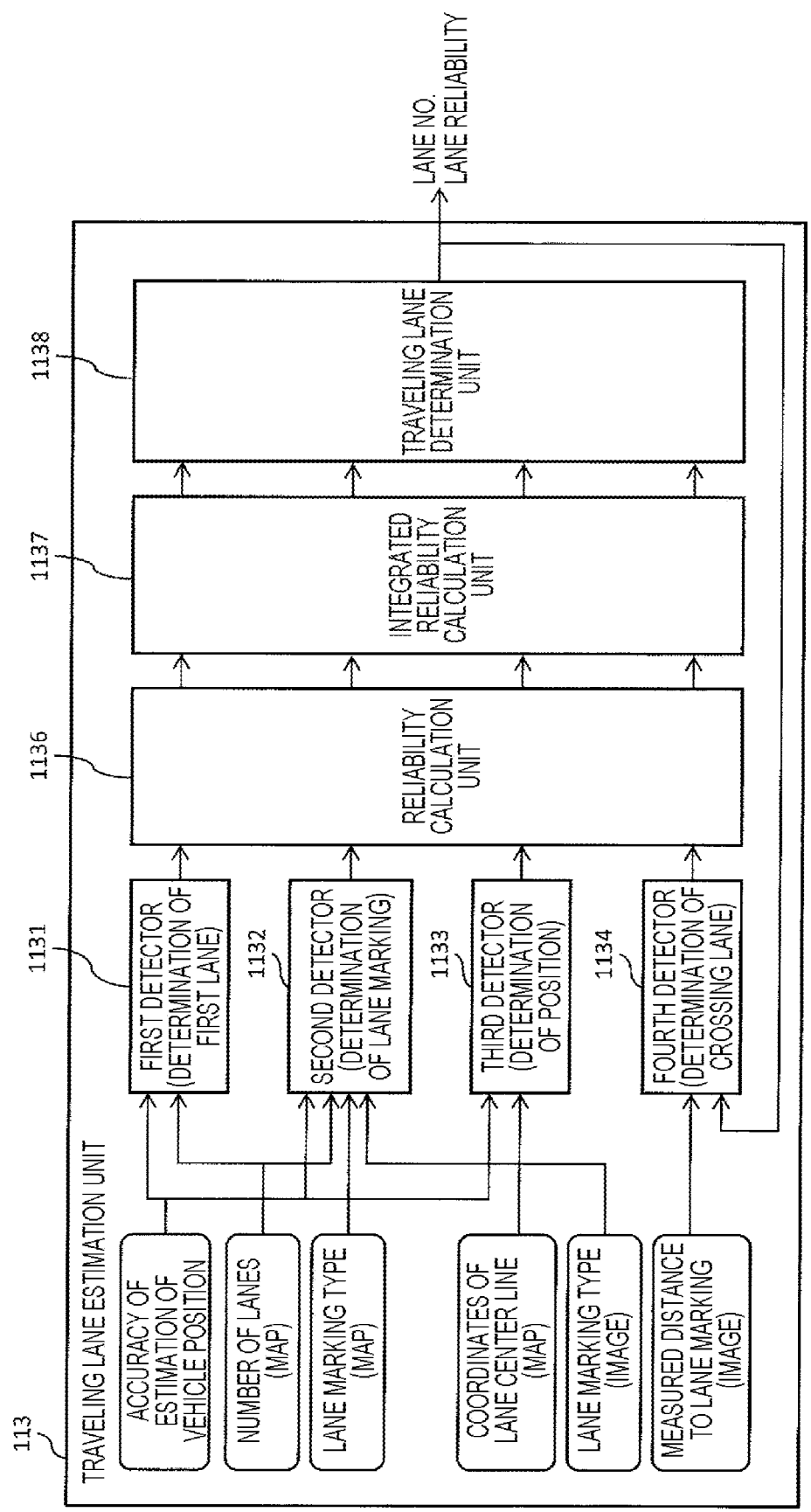
FIG. 2 is a detailed configuration view of a traveling lane estimation unit 113.

FIG. 2 is a detailed configuration view of the traveling lane estimation unit 113. The traveling lane estimation unit 113 includes a plurality of detectors that estimate a traveling lane. In the first embodiment, an example in which a first detector 1131 to a fourth detector 1134 are provided has been described. Each detector estimates a traveling lane by detection means and an estimation method that are different from those of the other detectors. A specific estimation method by each detector will be described later.

The traveling lane estimation unit 113 further includes a reliability calculation unit 1136, an integrated reliability calculation unit 1137, and a traveling lane determination unit 1138. The reliability calculation unit 1136 calculates the reliability of an estimation result by each detector. Alternatively, each detector may calculate the reliability by itself. Hereinafter, it is assumed, for convenience of description, that the reliability calculation unit 1136 calculates the reliability. The integrated reliability calculation unit 1137 calculates integrated reliability by integrating the reliabilities for each lane. A specific example of calculating the integrated reliability will be described later. The traveling lane determination unit 1138 finally estimates a traveling lane by comparing the integrated reliabilities with each other. The estimation result is output as, for example, a lane number and its reliability.

Figure 3:
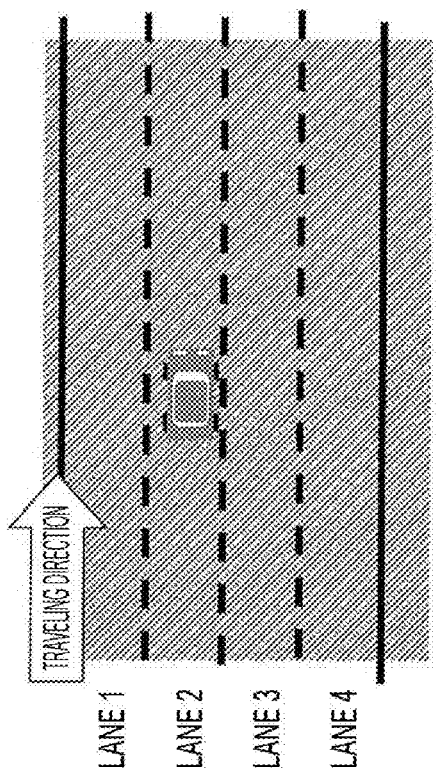
FIG. 3 is a view for explaining a procedure for calculating integrated reliability by an integrated reliability calculation unit 1137.

FIG. 3 is a view for explaining a procedure for calculating the integrated reliability by the integrated reliability calculation unit 1137.

Here, a scene is assumed, in which the vehicle is traveling on a road with four lanes. The number of estimation results of a traveling lane output by each detector is not necessarily one, and a plurality of candidates for a traveling lane may be output as the estimation result. The reliability calculation unit 1136 calculates reliability for each candidate. In the example shown in FIG. 3, it is assumed that the reliabilities as shown in the table in FIG. 3 are obtained for the estimation result of each detector.

The integrated reliability calculation unit 1137 integrates, for each lane, the reliabilities of the estimation results by the respective detectors. For example, the second detector 1132 and the third detector 1133 each output the lane number 3 as a candidate for the traveling lane, the reliabilities of which are 80 and 40, respectively. The other detectors do not recognize the lane number 3 as a candidate for the traveling lane. Therefore, the total of the reliabilities for the lane number 3 is 120. Also, for the other lane numbers, reliabilities are similarly integrated for each lane. Here, the reliabilities are integrated by simply adding together, but, for example, weighting can also be applied to each detector. For example, when the estimation result by the first detector 1131 is emphasized, the weight related to the first detector 1131 may be made greater than the weights related to the other detectors.

The integrated reliability calculation unit 1137 further calculates the integrated reliability for each lane by determining a relative ratio of the reliability integrated for each lane. In the example shown in FIG. 3, the grand total of the reliabilities of the estimation results by the respective detectors is 375 and the total of the reliabilities for the lane number 3 is 120. Therefore, the integrated reliability for the lane number 3 is 120/375×100=32. Also, for the other lane numbers, the integrated reliabilities are similarly calculated.

The integrated reliability is obtained by integrating the estimation results by the respective detectors across lanes. Therefore, even if the reliability of the estimation result by any of the detectors is low, the accuracy of the integrated reliability is considered to be sufficiently high if the reliabilities of the estimation results by the other detectors are high. In the first embodiment, a traveling lane is estimated by comparing the integrated reliabilities with each other based on such an idea. Therefore, the traveling lane determination unit 1138 outputs the lane number having the highest integrated reliability and the integrated reliability thereof as the estimation result.

Figure 4:
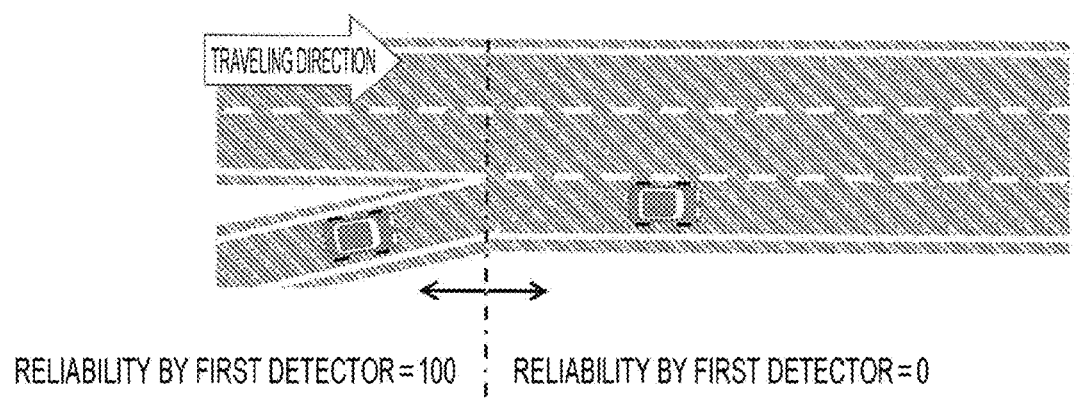
FIG. 4 is a view for explaining the reliability of an estimation result by a first detector 1131.

FIG. 4 is a view for explaining the reliability of the estimation result by the first detector 1131. The first detector 1131 determines whether or not the vehicle is traveling on a road with only one lane (one-lane road) by the collation of the high-precision map 140 according to the vehicle position estimated by the position estimation unit 111. Whether or not the vehicle is traveling on a one-lane road can be determined by, for example, acquiring the number of lanes of the road and according to whether or not the number of the lanes is one. The reliability calculation unit 1136 sets the reliability in a section, where the first detector 1131 determines that the vehicle is traveling on a one-lane road, to be higher than those in other sections. For example, the examples as described below can be considered.

(Example of Reliability on One-Lane Road: Part 1)

When compared in a section where the first detector 1131 determines that the vehicle is traveling on a one-lane road and in other sections, the reliability of the estimation result by the first detector 1131 is set to be higher in the former section. For example, the reliability for the first detector 1131 in a section where the vehicle is traveling on a one-lane road is 100, and the reliability for the first detector 1131 in other sections is 0, as shown in FIG. 4.

(Example of Reliability on One-Lane Road: Part 2)

In a section where the first detector 1131 determines that the vehicle is traveling on a one-lane road, the reliability of the estimation result by the first detector 1131 is set to be higher than the reliabilities of the determination results by the other detectors. For example, the reliability for the first detector 1131 in a section where the vehicle is traveling on a one-lane road is 100, and the reliabilities for the other detectors are set to be less than 100 even if those detectors are sufficiently reliable. In other sections, the reliabilities for the respective detectors are treated equally.

(Example of Reliability on One-Lane Road: Part 3)

In a section where the first detector 1131 estimates that the vehicle is traveling on a one-lane road, the traveling lane determination unit 1138 assumes that the vehicle is traveling on the one-lane road regardless of the estimation results by the other detectors. This is because when the accuracy of the vehicle position is sufficiently high, there is little significance in estimating a traveling lane on a road with only one lane. Specifically, the estimation result by the first detector 1131 may be adopted by setting the reliability for the first detector 1131 to be extremely high, or the traveling lane determination unit 1138 may finally determine the traveling lane by skipping the integrated reliability calculation unit 1137.

FIG. 5 is a view for explaining the reliability of the estimation result by the second detector 1132. The second detector 1132 acquires the number of lanes and information on the lane marking type of the road on which the vehicle is currently traveling, by the collation of the high-precision map 140 according to the vehicle position estimated by the position estimation unit 111. The second detector 1132 further estimates the lane in which the vehicle is traveling by identifying the lane marking type of the road included in the image of the surroundings of the vehicle.

In the example shown in FIG. 5, the lane marking on the left side of the vehicle is a solid line and the lane marking on the right side of the vehicle is a dotted line, as a result of identifying the lane marking type based on the image of the surroundings. The second detector 1132 can further determine that based on a result of the collation of the high-precision map 140, the lane of the road on which the vehicle is traveling, in which the left lane marking is a solid line and the right lane marking is a dotted line, is only a lane 1. Therefore, the second detector 1132 estimates that the vehicle is traveling in the lane 1.

The reliability calculation unit 1136 sets the reliability for the traveling lane, which the second detector 1132 has estimated based on the lane marking type, to be higher than those for the other lanes. In the example shown in FIG. 5, the second detector 1132 has determined that the vehicle is traveling in the lane 1 based on a section line type. Therefore, the reliability for the lane 1 is set to be higher than the reliabilities for the other lanes.

In another example shown in FIG. 5, when the lane markings on both sides of the vehicle are dotted lines, the second detector 1132 estimates that the vehicle is traveling in a lane 2 or a lane 3. In this case, one traveling lane cannot be determined in the estimation, so that the reliability may be set to be lower than that when the lane 1 or a lane 4 is estimated as the traveling lane.

FIG. 6 is a view for explaining the reliability of an estimation result by the third detector 1133. The third detector 1133 estimates the road on which the vehicle is traveling by the collation of the high-precision map 140 according to the vehicle position estimated by the position estimation unit 111. The third detector 1133 further acquires the coordinates of the center lines of all the lanes of the road by the collation of the high-precision map 140.

The reliability calculation unit 1136 calculates the distance (perpendicular distance) between the estimated vehicle position and the center line of each lane. For a lane where the distance between the vehicle position and the center line is smaller, the reliability calculation unit 1136 sets the reliability to be higher. For example, the examples as described below can be considered. (a) The reliability for the lane with the smallest distance to the center line is set to be the highest, and the reliabilities for the other lanes are set to a uniform value lower than the reliability for the above lane. (b) A reliability is set to be inversely proportional to the distance to the center line. (c) The reliabilities for lanes other than the lane with the smallest distance to the center line are set to 0.

The fourth detector 1134 periodically acquires a measured distance from the vehicle to the lane marking that is obtained from the image of the surroundings of the vehicle, and based on the measured distance, the detector determines, for each period, whether or not the vehicle has moved between the lanes by crossing the lane marking. The fourth detector 1134 assumes that the traveling lane is not changed until determining that the vehicle has moved between the lanes by crossing the lane marking. For each of the traveling lanes before and after the change, the estimation result by the traveling lane determination unit 1138 can be used. Alternatively, an estimation result by another determination unit may be used.

First Embodiment: Summary

The vehicle control device 100 according to the first embodiment calculates the integrated reliability by integrating, for each lane, the reliabilities of the estimation results by the respective detectors, and finally estimates the traveling lane by comparing the integrated reliabilities with each other. Thereby, even if the reliability of a detection method (a detector such as a camera or a GNSS tuner, or an estimation method) used by any of the detectors is low, an accurate estimation result can be obtained with the low reliability compensated for, by integrating the reliabilities of the detection methods used by the other detectors.

In the vehicle control device 100 according to the first embodiment, the detection methods that the respective detectors use when estimating a traveling lane are different from each other for each detector, the detection methods including those to be used in: estimating a traveling lane using a position estimation result (the first detector 1131 to the third detector 1133); estimating a traveling lane using an image of the surroundings of the vehicle (the fourth detector 1134); estimating a traveling lane using a combination thereof (the second detector 1132); and the like. Therefore, the integrated reliability is calculated by integrating the results of estimating a traveling lane from a plurality of viewpoints. Thereby, the reliability of the final estimation result can be enhanced.

In the vehicle control device 100 according to the first embodiment, when the first detector 1131 determines that the vehicle is traveling on a one-lane road, the estimation result is prioritized over other detectors. This makes it possible to simplify the estimation processing, which is advantageous from the viewpoints of calculation load, processing time, and the like. Further, the accuracy of the vehicle position is considered to be relatively high when the vehicle is traveling on a one-lane road, so that it is also advantageous from the viewpoint of reliability.

In the vehicle control device 100 according to the first embodiment, the fourth detector 1134 determines the traveling lane based on whether or not the vehicle has moved by crossing a lane marking. Thereby, the previous estimation result can be used until the vehicle moves by crossing a lane marking, which is advantageous from the viewpoints of calculation load, processing time, and the like.

Second Embodiment

In the first embodiment, it has been described that the reliability calculation unit 1136 sets the reliability according to the characteristics of the estimation method by each detector. When in addition to this, the reliability of an estimated vehicle position itself or of an image of the surroundings itself can be obtained, the reliability of the estimation result can be set by adding its reliability. Therefore, in a second embodiment of the present invention, an example will be described in which the reliability of an estimated vehicle position itself or of an image of the surroundings itself is added as the reliability of the estimation result. The configuration of a vehicle control device 100 is the same as that in the first embodiment.

A second detector 1132 estimates a traveling lane by identifying a lane marking type included in an image of the surroundings of the vehicle. Therefore, the estimation result depends on the accuracy of the image of the surroundings. When the accuracy of the image of the surroundings is low, a reliability calculation unit 1136 may set the reliability of the estimation result by the second detector 1132 to be lower than those in other cases. The accuracy of an image of the surroundings can be acquired from, for example, a control device that provides images of the surroundings. Alternatively, it is assumed that the accuracy of an image of the surroundings is low at night, so that the reliability may be set to be lower in the nighttime than in other time zones. The time may be held inside the vehicle control device 100, or when the time information obtained from a GNSS is included in, for example, the information on estimated vehicle position, the time information may be used.

A third detector 1133 acquires the distance between the lane center line and the vehicle using the vehicle position estimated by a position estimation unit 111. Therefore, the estimation result depends on the accuracy of the estimation of the vehicle position. The accuracy of the estimation of the vehicle position can be calculated based on, for example, the information on positioning error obtained from a GNSS tuner 120. When the accuracy of the estimation of the vehicle position is low, the reliability calculation unit 1136 may set the reliability of the estimation result by the third detector 1133 to be lower than those in other cases. When the accuracy of the estimation of the vehicle position is high, the reliability may be set to emphasize the estimation result by the third detector 1133.

After identifying the lane marking type included in an image of the surroundings of the vehicle, a fourth detector 1134 calculates the distance between the vehicle and the lane marking. Therefore, the determination result depends on the accuracy of the image of the surroundings.

When the accuracy of the image of the surroundings is low, the reliability calculation unit 1136 may set the reliability of the estimation result by the fourth detector 1134 to be lower than those in other cases. Similarly, the reliability may be set to be lower in the nighttime than in other time zones.

Third Embodiment

In the first and second embodiments, the reliability calculation unit 1136 calculates the reliabilities of the estimation results by the respective detectors (1131 to 1134), and the integrated reliability calculation unit 1137 and the traveling lane determination unit 1138 determine a traveling lane using the reliabilities. Therefore, as long as the reliabilities of the estimation results can be acquired, the integrated reliability calculation unit 1137 and the traveling lane determination unit 1138 can determine the integrated reliability and the traveling lane, respectively, regardless of what procedures the respective detectors (1131 to 1134) use for estimation. By using this, the respective detectors (1131 to 1134) can be freely replaced.

For example, it is assumed that the detection procedure to be performed by the first detector 1131 is updated and the first detector 1131 is replaced with a modified first detector 1131. Irrespective of a case before or after the first detector 1131 is replaced with the modified one, the reliability calculation unit 1136 calculates the estimation result by the first detector 1131 and delivers it to the integrated reliability calculation unit 1137. In other words, the reliability calculation unit 1136 handles the reliability of the estimation result by the modified first detector 1131 as the reliability of the estimation result by the first detector 1131 before modified. Thereby, the integrated reliability calculation unit 1137 and the traveling lane determination unit 1138 can perform the same processing whether the processing is performed before or after the modification of the first detector 1131. The same applies to the other detectors. Thereby, the respective detectors can be freely replaced, so that the traveling lane estimation unit 113 can be flexibly reconfigured according to, for example, the type or specification of the vehicle.

In order to enable the respective detectors to be freely replaced, the interface between each detector and the reliability calculation unit 1136 may be set to be the same, irrespective of a case before or after the replacement. For example, when each detector is configured as a software module, a common application programming interface (API) for transmitting and receiving estimation results between each module and the reliability calculation unit 1136 may be provided in advance in order that any module, before and after the replacement, transmits and receives estimation results via the API. Also, when each detector is configured by hardware, the interface such as a signal line may be set to be the same, irrespective of a case before or after the replacement.

<Modifications of the Present Invention>

The present invention is not limited to the above embodiments, and includes various modifications. For example, the above embodiments have been described in detail for easy understanding of the present invention, and the present invention is not necessarily limited to embodiments including all the configurations described above. Additionally, part of the configuration of an embodiment can be replaced with the configuration of another embodiment, or the configuration of an embodiment can be added with the configuration of another embodiment. Additionally, part of the configuration of each embodiment can be added with another configuration, or deleted or replaced.

Some or all of the above configurations, functions, processing units, processing means, and the like may be realized by hardware in which they are designed with, for example, integrated circuits. Alternatively, the above configurations, functions, and the like may be realized by software in which a processor interprets and executes a program that realizes each function. Information on a program, a table, a file, etc., for realizing each function can be stored in a recording device such as a memory, a hard disk, or a solid state drive (SSD), or a recording medium such as an IC card or an SD card. Additionally, the control lines and the information lines that are considered to be necessary for explanation are described, but all of the control lines and the information lines that are necessary for a product are not necessarily described. In fact, it may be considered that almost all the configurations are connected to each other.

In the above embodiments, it has been described that the traveling lane determination unit 1138 estimates the lane with the highest integrated reliability as a traveling lane. The traveling lane determination unit 1138 may use other methods as long as it can estimate a traveling lane by comparing the integrated reliabilities with each other. For example, it is considered to estimate the traveling lane with the maximum likelihood by comparing the time-series changes in the integrated reliabilities for the respective lanes with each other.

In the above embodiments, it has been described that a traveling lane is estimated by using a position estimation result by a GNSS tuner or a gyro sensor and an image of the surroundings. But, it can also be considered that instead of or in combination with them, other sensors are used. For example, it can be considered that a surrounding structure of the vehicle is identified by a laser ranging sensor or a radar, and based on this, a traveling lane is estimated. Even in that case, the method of the present invention, in which reliabilities are integrated for each lane by including reliability in the estimation result by each detector, can be used.

REFERENCE SIGNS LIST 100 vehicle control device
110 calculation unit
111 position estimation unit
113 traveling lane estimation unit
1131 first detector
1132 second detector
1133 third detector
1134 fourth detector
1136 reliability calculation unit
1137 integrated reliability calculation unit
1138 traveling lane determination unit
114 position correction unit
120 GNSS tuner
130 gyro sensor
140 high-precision map

The invention claimed is:

1. A vehicle control device that controls operations of a vehicle, the vehicle control device comprising:
   first and second detectors that estimate a lane in which the vehicle is traveling;
   a reliability calculation unit that calculates reliabilities of estimation results by the respective first and second detectors;
   an integrated reliability calculation unit that calculates integrated reliability in which the reliabilities are integrated for each lane;
   a traveling lane determination unit that estimates a lane in which the vehicle is traveling by using the integrated reliability; and
   a position estimation unit that estimates a position of a vehicle; and map data stored in a storage device, wherein: the first detector acquires a position of the vehicle via the position estimation unit and acquires the number of lanes of a road on which the vehicle is traveling using the map data,
   wherein:
   the first detector estimates the lane using a first detection procedure, and the second detector estimates the lane using a second detection procedure different from the first detection procedure;
   the integrated reliability calculation unit calculates a first integrated reliability, representing a probability that the vehicle is traveling in a first lane, by using the reliability of a result of the first detector estimating that the vehicle is traveling in the first lane, and the reliability of a result of the second detector estimating that the vehicle is traveling in the first lane;
   the integrated reliability calculation unit calculates a second integrated reliability, representing a probability that the vehicle is traveling in a second lane, by using the reliability of a result of the first detector estimating that the vehicle is traveling in the second lane, and the reliability of a result of the second detector estimating that the vehicle is traveling in the second lane;
   the traveling lane determination unit estimates a lane in which the vehicle is traveling by comparing the first integrated reliability and the second integrated reliability; and
   when the first detector estimates that the number of lanes of the road on which the vehicle is traveling is one, the reliability calculation unit sets the reliability of the estimation result by the first detector to be higher than the reliability of the estimation result by the second detector.

2. The vehicle control device according to claim 1, further comprising: a position estimation unit that estimates a position of a vehicle; and map data stored in a storage device, wherein: the first detector acquires a position of the vehicle via the position estimation unit and acquires the number of lanes of a road on which the vehicle is traveling using the map data; and
   when the first detector estimates that the number of lanes of the road on which the vehicle is traveling is one, the traveling lane determination unit assumes that the vehicle is traveling in the lane.

3. The vehicle control device according to claim 1, further comprising: a position estimation unit that estimates a position of a vehicle; and map data stored in a storage device, wherein: the first detector acquires a position of the vehicle via the position estimation unit and acquires the number of lanes of a road on which the vehicle is traveling using the map data; and
   in a road section in which the first detector estimates that the number of lanes of the road on which the vehicle is traveling is one, the reliability calculation unit sets the reliability of the estimation result by the first detector to be higher than in other road sections.

4. The vehicle control device according to claim 1, wherein:
   the first detector is configured to be replaceable with a modified first detector that estimates the lane using a procedure different from the first detection procedure; and
   the reliability calculation unit calculates the reliability of an estimation result by the modified first detector as the reliability of the estimation result by the first detector, so that the integrated reliability calculation unit and the traveling lane determination unit can perform the same processing whether the processing is performed before or after replacement of the first detector with the modified first detector.

5. The vehicle control device according to claim 1, further comprising: a position estimation unit that estimates a position of a vehicle; map data stored in a storage device; and an image acquisition device that acquires an image of surroundings of a vehicle, wherein: the first detector acquires the image of the surroundings of the vehicle and specifies a lane marking type of a road included in the image of the surroundings to estimate the lane, and the first detector further acquires a position of the vehicle via the position estimation unit and determines the lane using the map data; and for a lane where the estimation result by the first detector generated when the image of the surroundings is used matches the estimation result by the first detector generated when the position of the vehicle and the map data are used, the reliability calculation unit sets the reliability to be higher than those of the other lanes.

6. The vehicle control device according to claim 1, further comprising: a position estimation unit that estimates a position of a vehicle; and map data stored in a storage device, wherein: the first detector acquires a position of the vehicle via the position estimation unit and acquires coordinates of a center line of a lane using the map data;

the reliability calculation unit calculates a first distance between the position of the vehicle and the center line of each lane that are acquired by the first detector; and for a lane where the first distance is smaller, the reliability calculation unit sets the reliability to be higher.

7. The vehicle control device according to claim 1, further comprising an image acquisition device that acquires an image of surroundings of a vehicle, wherein: the first detector acquires the image of the surroundings of the vehicle and determines whether or not the vehicle has crossed a section line of a road using the image of the surroundings; and the first detector assumes that the vehicle continues traveling without changing a lane while the vehicle has not crossed the section line of the road.

8. The vehicle control device according to claim 1, wherein the integrated reliability calculation unit calculates the first or second integrated reliability by multiplying the estimation result by the first detector by a first weight and multiplying the estimation result by the second detector by a second weight.

9. The vehicle control device according to claim 1, further comprising an image acquisition device that acquires an image of surroundings of a vehicle, wherein: the reliability calculation unit acquires information indicating accuracy of the image of the surroundings of the vehicle; and the reliability calculation unit adjusts the reliability of one of the estimation result by the first detector and the estimation result by the second detector according to the accuracy, the one obtained by using the image of the surroundings.

10. The vehicle control device according to claim 1, wherein: the reliability calculation unit acquires information indicating accuracy of estimation by a position estimation unit; and the reliability calculation unit adjusts the reliability of one of the estimation result by the first detector and the estimation result by the second detector according to the accuracy of the estimation, the one obtained by using the position estimation unit.

* * * * *